Feb. 8, 1955     J. R. MADSEN ET AL     2,701,393
SPACE SAVING STRUCTURE FOR CAMP VEHICLE INTERIORS
Filed March 20, 1951
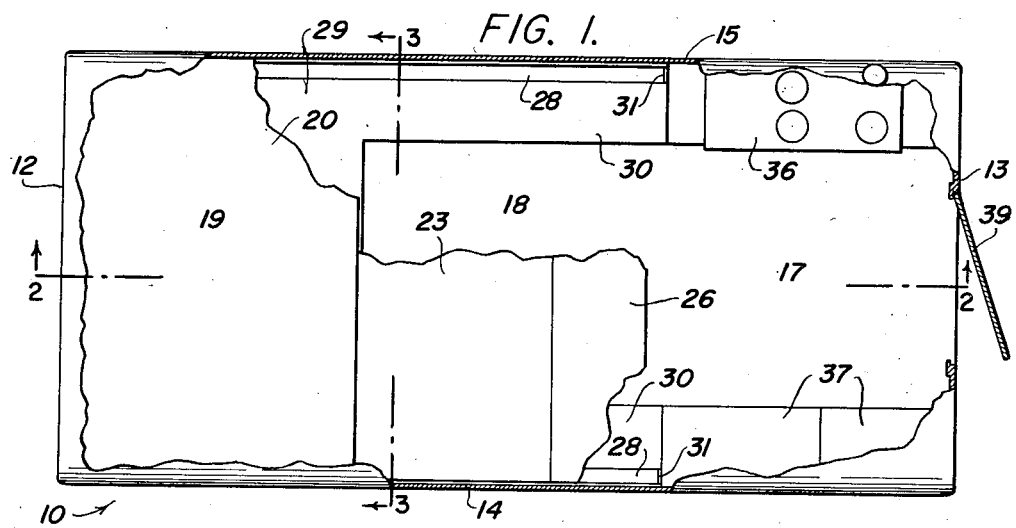
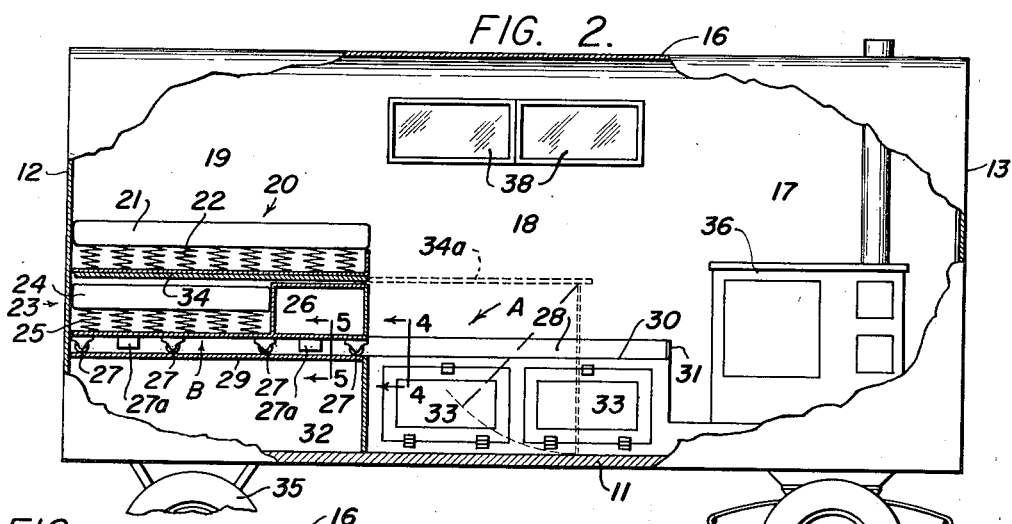
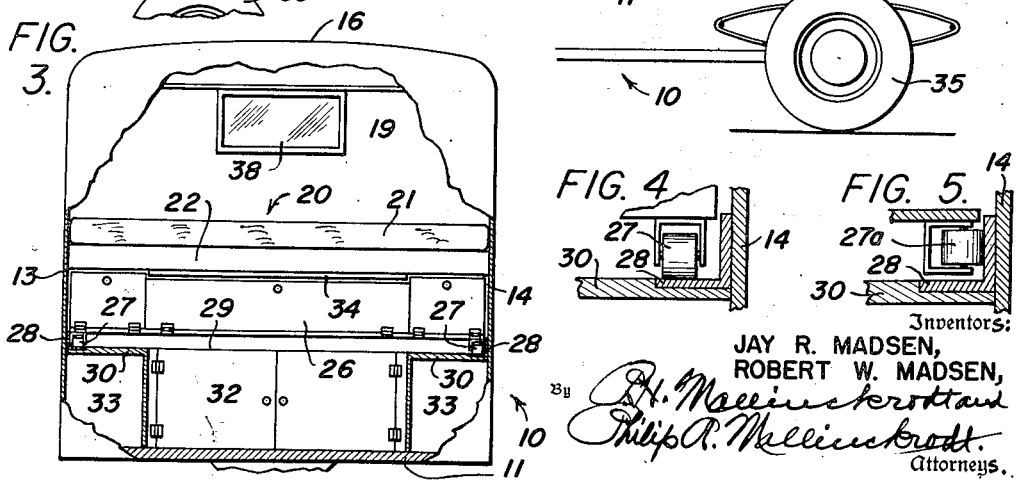
Inventors:
JAY R. MADSEN,
ROBERT W. MADSEN,
Attorneys.

United States Patent Office 2,701,393
Patented Feb. 8, 1955

2,701,393

SPACE SAVING STRUCTURE FOR CAMP VEHICLE INTERIORS

Jay R. Madsen and Robert W. Madsen, Mount Pleasant, Utah

Application March 20, 1951, Serial No. 216,613

2 Claims. (Cl. 20—1.11)

This invention relates to a camp vehicle which is typical of what is commonly known as a "sheep camp."

The principal object of the invention is to provide a camp vehicle which is arranged so as to gain the most advantageous and economical use of the limited space to which such a vehicle is necessarily restricted.

In accomplishing the object of the invention, the floor space of the vehicle housing is divided roughly into three parts, the forward part forming a kitchen, the middle part a dining and living space and the rear portion a sleeping or bunk space. These spaces are enclosed by two side walls and two end walls.

According to the invention, the sleeping space and living space are utilized to achieve a maximum of economy and convenience.

A feature of the invention is that a utility deck, substantially coextensive with the combined living and sleeping areas, is spaced upwardly of the floor so as to provide a one-level deck with a runway for a rollaway utility carriage. This utility carriage is arranged so it can be temporarily rolled out into the living space. In order to provide maximum advantages, a bed is spaced upwardly of the utility deck, while an auxiliary bed is supported on the utility deck just below the first-mentioned bed.

In the living space, approximately on the level of the utility deck are two oppositely disposed seats or benches which extend longitudinally along the living space and close to the side walls of the housing structure. At the back of each seat is a rail which extends the length of the respective bench, and then continues back into the bunk space. The rails preferably have a flat running surface and are arranged to be flush with the respective seat surfaces. By mounting the utility carriage on depending rollers having a broad face surface, the carriage can be rolled across the utility deck into the living space and back again with maximum facility. This is accomplished without interfering in the least with the normal use of the living or dining space. In addition to the depending rollers, the utility carriage has end rollers which extend axially up and down somewhat beyond the end faces of the carriage. By making the track rails of angle irons, the inside vertical surfaces thereof provide bearing for the end rollers.

The inside width of the vehicle of the invention is over six feet so that the lengthwise dimensions of the beds come well within the transverse width of the vehicle structure. This permits the living or dining space and the kitchen space to be used to the fullest extent for their normal purposes.

A feature of the invention is that the configuration of the utility deck in plan is substantially U-shaped. The bend of the U has a given width across the U approximately equal to the width of the vehicle. The legs of the U extend longitudinally of the vehicle, and are approximately equal in length to the length of the U-bend. This makes it possible to accommodate a carriage which normally occupies the area of the U-bend, but which carriage is selectively withdrawable so as to overlie the legs of the U. This feature alone saves at least one-third of the area of a vehicle floor and thus cuts down the usual length of a vehicle accordingly. The utility carriage thus makes available a maximum living space while providing maximum sleeping accommodations within the limited space of the vehicle.

In the accompanying drawing, which illustrates an excellent embodiment of the invention:

Fig. 1 represents a floor plan of a camp vehicle equipped in accordance with the provisions of the invention;

Fig. 2, a longitudinal vertical section taken on the line 2—2 in Fig. 1;

Fig. 3, a transverse vertical section, taken on the line 3—3 in Fig. 2; and

Figs. 4 and 5, fragmentary cross-sections taken on the lines 4—4 and 5—5 respectively, in Fig. 1, drawn to an enlarged scale.

Referring to the drawing, the numeral 10 denotes in general, a camp vehicle of the invention. In presently preferred particular, the camp vehicle comprises a housing made up of a floor 11, two end walls 12 and 13, two side walls 14 and 15, and a top or roof 16.

The front part of the housing is occupied by a kitchen 17 while the middle part 18 and the rear part 19 together are nominally occupied by a utility deck A. This utility deck A in plan, has approximately the shape of a capital letter U. The bend 19 of the U in Fig. 1, for illustration, is at the rear of the vehicle, while the legs of the U occupy the two oppositely located spaces 30. The length of the U-legs 30 is substantially equal to the length of the U-bend 19, so that a bed 20 can be normally disposed over the carriage B. Spaced upwardly from the utility deck A is a bed 20 which includes a mattress and bedding 21 resting on springs 22. Supported on the utility deck, underneath the bed 20, is a utility carriage B on which is mounted an auxiliary bed 23 which contains for example a mattress and bedding 24 resting on springs 25. Alongside the bed 23 and in front thereof, are one or more compartments 26 which are designed to receive any desired household commodities.

The utility carriage B is rollaway in character and rests on heavy straight faced rollers 27 which travel on a track advantageously made of metal rails 28, which rails extend along the outer edges of the U-legs for the entire length of the U. The rails 28 are preferably made of angle irons placed at the back of the respective benches 30. The horizontal legs of the rails 28 are advantageously countersunk, flush with the seating surfaces of the respective benches so as not to interefere with seating convenience. The horizontal legs of rails 28 provide the aforementiond track surfaces for rollers 27, while the vertical legs thereof provide track surfaces for flat faced rollers 27a which extend axially up-and-down and project somewhat beyond the ends of the utility carriage B. The rollers 27a overcome any binding tendency between the bed and the respective track surfaces. At 31 are stops which prevent overtravel of the utility carriage B when it is rolled out into the space 18. As thus arranged, the compartments 26 are always conveniently accessible in the various positions of utility carriage B.

A compartment 32 is provided below the utility deck A, and compartments 33 below benches 30. Both the compartments 32 and 33 are utilized for the storage of commodities.

The present arrangement of beds 20 and 23, allows space between these two beds for a sliding table 34, which is extensible as indicated by dotted lines 34a. The inside floor space of this camp vehicle ordinarily measures approximately six feet and three inches in width and twelve feet in length, thus the beds 20 and 23 along the length thereof, are conveniently accommodated transversely of the housing body 10.

The present camp housing is advantageously built on a four-wheel spring chassis of which the wheels are indicated at 35. A tongue or other attaching means (not shown) is provided for hitching the camp vehicle to an automotive vehicle or other means of transportation. A stove 36 is placed to conveniently balance the weight of cupboards 37 in the kitchen 17. Windows 38 and a door 39 are provided at convenient locations.

While the foregoing description is necessarily somewhat specific the scope of the desired patent protection is amplified in the following claims.

What is claimed is:

1. In a camp vehicle, a housing having opposed side walls and enclosing kitchen, living and bed room areas therein, a U-shaped elevated deck having a bend portion extending transversely of the bed room end of the housing and a leg portion extending from each end of the bend portion into the living area, said leg portions being disposed against the opposite side walls, a track on the outer portion of each leg and on each end part of the bend, a bed fixedly mounted horizontally above the bend transversely of the housing between the side walls, an auxiliary bed having rollers attached thereto rolling on said tracks for horizontal movement beneath the fixed bed and on the bend to a position laterally of the fixed bed and on said deck legs into the living area, and a table normally disposed between the upper and lower beds and slidable horizontally to an extended position in the living area of the housing.

2. In a camp vehicle as claimed in claim 1 wherein said tracks have substantially vertical and horizontal components the faces of which are engaged by said rollers.

References Cited in the file of this patent

UNITED STATES PATENTS

| | | |
|---|---|---|
| 1,333,909 | Firestone | Mar. 16, 1920 |
| 1,368,510 | Kreuzkamp | Feb. 15, 1921 |
| 1,449,968 | Bickham | Mar. 27, 1923 |
| 1,485,550 | Bland | Mar. 4, 1924 |
| 1,937,900 | Levy et al. | Dec. 5, 1933 |
| 2,329,419 | Reed | Sept. 14, 1943 |
| 2,364,595 | Tully et al. | Dec. 5, 1944 |
| 2,432,572 | Jones et al. | Dec. 16, 1947 |
| 2,531,687 | Jones | Nov. 28, 1950 |